United States Patent Office 3,806,451
Patented Apr. 23, 1974

3,806,451
METHOD FOR THE TREATMENT OF SCALE
Jack F. Tate, Houston, Tex., assignor to
Texaco Inc., New York, N.Y.
No Drawing. Continuation-in-part of application Ser. No. 887,312, Dec. 22, 1969. This application Sept. 22, 1971, Ser. No. 182,880
Int. Cl. C02b 5/02, 5/04, 5/06
U.S. Cl. 210—58     3 Claims

ABSTRACT OF THE DISCLOSURE

Method for the treatment of scale, particularly calcium sulfate scale, using a water soluble partially esterified polyphosphoric acid having a prescribed formula, the corresponding water soluble salts and mixtures.

---

This application is a continuation-in-part application of my application Ser. No. 887,312, filed Dec. 22, 1969, now abandoned.

This invention is directed to a method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. More particularly, the invention is useful in the prevention and/or inhibition of build-up of scale deposits on a surface contacted by water containing scale forming quanities of sulfates such as calcium or barium.

The term "surface" as used in the accompanying specification and claims includes the metal surfaces of equipment used in gas and oil wells, the flow lines, and auxiliary producing equipment; the water storage tanks, and the like, heat exchangers, evaporative coolers and so forth, as well as the surfaces of producing strata in and around the well bore and in the formation, that come in contact with water containing scale forming constituents.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of a hard crystalline calcium sulfate deposit which gradually builds up on the walls of the well tubing, for example, to a point where it may choke off fluid flow in the tube if remedial measures were not undertaken.

Another cause of the scale formation is attributed to the precipitation of scale material from potentially supersaturated solutions thereof. When the operating variables of temperature and pressure change adversely, or solvent is allowed to evaporate, thus concentrating the solution precipitation of the salt in the tubing and surrounding strata occurs.

The use of strong alkali solutions for the removal of sulfate scale has been proposed. It has been claimed that under certain favorable conditions of temperatures and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, producing equipment and the producing strata about the bore hole.

It is accordingly an object of this invention to provide a method of inhibiting and/or preventing the build-up of scale deposits in gas and oil flow lines, auxiliary equipment, well tubing and the surrounding subsurface strata.

A further object is to provide a scale treating method for use in preventing the build-up of scale deposits in the well tubing, producing equipment, the bore hole and surrounding strata.

A still further object of this invention is to provide a method for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising an aqueous solution of a water soluble partially esterified polyphosphoric acid compound having the general formula

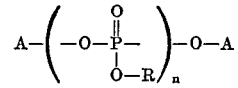

wherein A represents a hydrogen atom or an alkali metal, R represents an alkyl group containing from 1 to 10 carbon atoms therein, and $n$ is a whole number from 2 to 6, and mixtures thereof, said treating composition having an average apparent molecular weight in the range of from about 206 to about 1300, preferably from about 380 to about 700, being employed in an amount sufficient to inhibit the development of scale in an aqueous system.

The invention also comprises a method of treating equipment susceptible to the development of scale deposits therein such as water storage tanks and the like, particularly oil field equipment, using the scale prevention composition.

Representative phosphate ester compounds within the scope of this invention include the preferred compounds, tetraethyltetraphosphoric acid, tetrapropyltetraphosphoric acid, tripentyltriphosphoric acid, and trihexyltriphosphoric acid, and broadly encompass compounds such as dimethyldiphosphoric acid, hexamethylhexaphosphoric acid, tri(decyl)triphosphoric acid, hexa(decyl)hexaphosphoric acid, the corresponding alkali metal salts and mixtures thereof.

The aforesaid esters can be prepared by known preparative methods such as by dehydration of phosphoric acid and partial esterification with a suitable alkanol or mixed alkanols, optionally followed by neutralization with alkali metal salt solutions or by partial esterification of phosphoric acid, followed by dehydration and optionally neutralization is part of one or all of the acidic hydrogen atoms.

In carrying out one aspect of the present invention the method thereof comprises introducing the scale prevention composition into the equipment to be protected, such as oil well tubing, in the form of an aqueous solution in an amount sufficient to provide the phosphate ester compound therein at a concentration of from about 0.001 to about 0.30% by weight and maintaining the scale treating composition in contact with the internal surfaces thereof for a contact time sufficient to prevent and/or inhibit the development of scale depositions or additional scale deposits therein. It is desirable to circulate the scale prevention composition through the system to provide adequate contact of the composition with the surfaces to be protected. Underground strata surrounding the well bore can be treated in a like mannner, i.e. by passing the solution into said strata such as by injection of the solution down through the bore hole or production tubing, preferably under pressure.

In general it has been found that excellent protection against objectionable scale deposits can be obtained by maintaining the treating composition in contact with the scale for a contacting time period of from about 2 to about 24 hours and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention, i.e. on a semiweekly or weekly basis, then shorter contacting times (e.g. averaging about 4 to 10–12 hours) can be used. Less frequent treating intervals, i.e. at about every 10 or 15 days generally necessitate corresponding longer contacting times that may average between 12 and 24 hours.

The scale prevention composition is used in an amount sufficient to provide to the treating solution the phosphate ester compound in an amount of from 0.001 to about 0.30% by weight. It has been found that excellent results are obtained with the phosphate ester compound at concentrations in the range of from about 0.001 to 0.10% by weight. Higher concentraitons (above about 0.03%) do not provide improved scale protection.

A more complete understanding of the invention will be obtainable from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 p.p.m. of calcium sulfate and 50,000 p.p.m. of sodium chloride. A preweighed metal rotor attached to an externally provided mechanical stirring device was immersed in the test solution for a 24 hour time period. The test solution containing a predetermined quantity of the test material was maintained at a temperature of 104° F. during the test period. At the end of the 24 hours, the rotor was removed from the test solution and from the stirrer. The scale deposited on the rotor was removed, dried and weighed. In all, several tests were conducted on each material being evaluated and the average of the tests was taken as the amount of scale deposit formed during the test period. The above laboratory test procedure affords good correlation between the results thereby obtained and larger scale field evaluations of scale preventing compositions. In addition a control test was run under the same conditions except that no test material was added to the test solution.

The following table records the results of the test.

TABLE

| Example | Additive | Amount of additive (p.p.m.) | Average weight of scale (grams) |
|---|---|---|---|
| Control[1] | | | 0.58 |
| I | A[2] | 20 | 0.03 |

[1] Control is a blank example, i.e., the test procedure was run without any phosphate compound present in the test solution.
[2] Additive A is dipotassium tetra(alkyl)tetraphosphate wherein each alkyl group contains three carbon atoms.

From the data presented in the above table, it is evident taht the phosphate ester compounds of the present invention are effective calcium sulfate scale inhibitors at low concentrations.

Obviously, other modifications and variations of the invention as hereinbefore set forth may be made without departing from the spirit and scope thereof, and therefore only such limitations should be imposed as are indicated in the appended claims.

I claim:

1. Method of controlling the build-up of calcium and barium sulfate scale on a surface contacted with water containing said scale-forming constituents by incorporating in said water an aqueous solution consisting of from about 0.01 to about 0.30% by weight of a member selected from the group consisting of tetrapropyltetraphospohric acid, the corresponding alkali metal salts and mixtures thereof, said member being maintained in contact with said surface for a period of from about 2 to about 24 hours to prevent the build-up of scale thereon.

2. Method as claimed in claim 1 wherein said member is present in an amount of from about 0.001 to 0.01% by weight.

3. Method as claimed in claim 1 wherein said salt is dipotassium tetra-propyltetraphosphate.

References Cited
UNITED STATES PATENTS

| | | | |
|---|---|---|---|
| 3,429,824 | 2/1969 | Tate | 252—180 |
| 3,168,554 | 2/1965 | Phillips et al. | 260—933 X |
| 2,947,774 | 8/1960 | Levine | 260—933 X |
| 3,462,365 | 8/1969 | Vogelsang | 252—180 X |
| 3,510,436 | 5/1970 | Silverstein et al. | 21—2.7 A |

HARRY WONG, Jr., Primary Examiner

U.S. Cl. X.R.

252—8.55, 180

PO-1050
(5/69)

UNITED STATES PATENT OFFICE
CERTIFICATE OF CORRECTION

Patent No. 3,806,451          Dated April 23, 1974

Inventor(s) Jack F. Tate

It is certified that error appears in the above-identified patent and that said Letters Patent are hereby corrected as shown below:

| | | |
|---|---|---|
| Col. 2, | line 60 | "is" should read --in-- |
| | line 68 | "0.30%" should read --0.03%-- |
| Col. 3, | line 30 | "0.30%" should read --0.03%-- |
| | line 32 | "0.10%" should read --0.01%-- |
| | line 32 | "concentraitons" should read --concentrations-- |
| Col. 4, | line 17 | "taht" should read --that-- |
| | line 30 | "0.30%" should read --0.03%-- |
| | line 32 | "pohric" should read --phoric-- |

Signed and sealed this 10th day of September 1974.

(SEAL)
Attest:

McCOY M. GIBSON, JR.          C. MARSHALL DANN
Attesting Officer              Commissioner of Patents